F. O. BALL.
CARBURETER.
APPLICATION FILED MAY 26, 1919.
Reissued Jan. 13, 1920.
14,790.
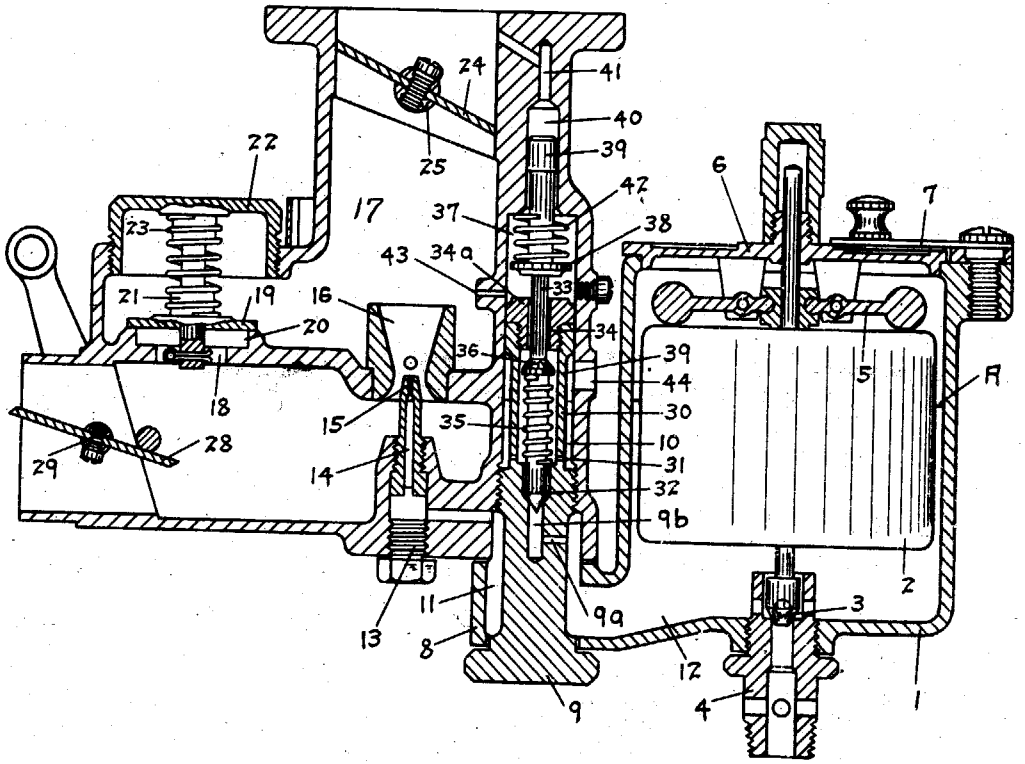
Inventor
Frederick O. Ball
By
Attorney

UNITED STATES PATENT OFFICE.

FREDERICK O. BALL, OF DETROIT, MICHIGAN, ASSIGNOR, BY DIRECT AND MESNE ASSIGNMENTS, TO BALL & BALL CARBURETOR COMPANY, OF DETROIT, MICHIGAN, A CORPORATION OF MICHIGAN.

CARBURETER.

14,790. Specification of Reissued Letters Patent. Reissued Jan. 13, 1920.

Original No. 1,243,480, dated October 16, 1917, Serial No. 117,607, filed August 30, 1916. Application for reissue filed May 26, 1919. Serial No. 299,965.

*To all whom it may concern:*

Be it known that I, FREDERICK O. BALL, a citizen of the United States, and a resident of Detroit, in the county of Wayne and State of Michigan, have invented certain new and useful Improvements in Carbureters, of which the following is a specification.

The invention relates to carbureters and consists in certain improvements in the construction thereof as will be hereinafter fully described and pointed out in the claims.

It is desirable to momentarily supplement the normal fuel supplied to the carbureter as the throttle is opened. Such devices are usually termed pick-up devices and this invention has particular reference to this feature.

The invention is illustrated in the accompanying drawing wherein a vertical section of a carbureter is shown.

1 marks the float chamber, 2 the float, 3 the inlet valve, 4 the inlet connection, 5 the mechanism for communicating the movement of the float to the valve, 6 the cover and 7 the clip for holding the cover in place.

The float chamber has a projection 8 extending under the body of the carbureter and is secured to the body of the carbureter by a screw 9 which extends through the extension 8 and forms a closure for the chamber 10. The screw has a reduced portion forming a passage 11 which communicates with the passage 12. A passage 13 extends into the body of the carbureter from the passage 11 and communicates with a passage 14 leading to the nozzle 15. The nozzle is arranged in the Venturi tube 16 forming an initial air opening of the carbureter. The Venturi tube opens into the mixing chamber 17. An auxiliary air opening 18 is provided. This is controlled by a yielding valve 19 operating on the seat 20. The valve is guided by a pin 21 extending from a cap 22. A spring 23 yieldingly holds the valve to its seat. A throttle valve 24 is arranged on the stem 25.

A choke valve 28 is mounted on the stem 29 and controls the air inlet in the usual manner.

The screw 9 has a radial opening $9^a$ which communicates with the passage 11 leading to the axial passage $9^b$. The passage $9^b$ extends upwardly into a cylindrical extension 30 extending upwardly from the screw 9. This is connected by the radial openings 31 with the chamber 10. A needle valve 32 controls the passage $9^b$. It has a stem 33 which extends upwardly through a passage 34 in a screw $34^a$ on the upper end of the extension 30. A spring 35 is arranged around the stem 33 and operates against the back of a valve 36, the valve 36 controlling the passage 34. The spring, therefore, when released opens the valve 32. The stem 33 engages a shoulder 38 carried by a plunger 39. The plunger 39 operates in a cylinder 40. The cylinder 40 is connected by a passage 41 with the mixing chamber above the throttle 24. A spring 42 operates against the shoulder 38 and is of sufficient strength to overcome the spring 35 and close the valve 32 when the parts are not influenced by the piston or cylinder 39. The passage 34 communicates with the chamber 37 and this communicates through a passage 43 with the mixing chamber. A passage 44 leads from the upper end of the chamber 10 to the outer air. The operation of the device is as follows: When the throttle is closed and the engine running the pressure above the throttle is very much reduced and this being communicated through the passage 41 to the cylinder 40 subjects the upper face of the piston 39 to a much smaller pressure than that below the piston. In consequence the piston 39 is drawn upwardly compressing the spring 42 and permitting the spring 35 to close the valve 36 and open the valve 32. With the parts in this position, the fuel flows from the float chamber through the passages $9^a$ and $9^b$ to the chamber 10 and fills to the level of the fuel in the float chamber as indicated at A. When the throttle is open, the difference in pressure above and below the throttle is very slight and consequently the pressures above and below the piston 39 are slight. Under these conditions the spring 42 is of sufficient strength to force the shoulder 38 downwardly and with it the stem 33, thus closing the valve 32 and opening the valve 36. Under these conditions the fuel which is accumulated in the chamber is swept through the extension 30 by way of the passages 31 through the passages 34 and 43 to the mixing chamber. As soon as the receptacle is emptied no further supply can reach the fuel chamber until the throttle is again closed so that after the discharge of the pre-determined quantity which the receptacle will take up the normal functioning of the carbureter is not interfered with.

As shown the throttle is closed. It will be understood that the parts and engine are at rest. As soon as suction is applied above the throttle the piston 39 will be lifted.

What I claim as new is:—

1. In a carbureter, the combination of a mixing chamber; means for supplying air and the normal fuel to said chamber; a throttle valve; devices for augmenting the normal fuel supply after the throttle is opened comprising a receptacle having a supply passage leading from a fuel supply and a discharge passage leading to the mixing chamber; valves for said passages; and means sensitive to variations of pressure at the discharge side of the throttle acting when the throttle is actuated for actuating said valves alternately to close the supply passage and open the discharge passage when the throttle is opened and to close the discharge passage and open the supply passage when the throttle is closed.

2. In a carbureter, the combination of a mixing chamber; means for supplying air and the normal fuel to said chamber; a throttle valve; devices for augmenting the normal fuel supply after the throttle is opened comprising a receptacle having a supply passage leading from a fuel supply and a discharge passage leading to the mixing chamber; valves for said passages; and a motor having one side subjected to pressure at the discharge side of the throttle and acting when the throttle is actuated to actuate said valves alternately to close the supply passage and open the discharge passage when the throttle is opened and to close the discharge passage and open the supply passage when the throttle is closed.

3. In a carbureter, the combination of a mixing chamber; means for supplying air and the normal fuel to said chamber; a throttle valve; devices for augmenting the normal fuel supply after the throttle is opened comprising a receptacle having a supply passage leading from a fuel supply and a discharge passage leading to the mixing chamber; valves for said passages; a motor comprising a cylinder having a connection with the mixing chamber at both sides of the throttle; a piston in the cylinder; and a connection between said motor and said valves whereby when the throttle is actuated the valves are actuated alternately to close the supply passage and open the discharge passage when the throttle is opened and to close the discharge passage and open the supply passage when the throttle is closed.

4. In a carbureter, the combination of a mixing chamber; means for supplying air and the normal fuel to said chamber; a throttle valve; devices for augmenting the normal fuel supply after the throttle is opened comprising a receptacle having a supply passage leading from a fuel supply and a discharge passage leading to the mixing chamber; double valves having opposing sides, one controlling the supply passage and the other the discharge passage; a spring tending to close the valve controlling the discharge passage; a spring tending to close the supply passage and operating against said first spring; a motor comprising a cylinder subjected to pressures at the opposite sides of the throttle; a piston in said cylinder operating against said valves in connection with said springs to open the valve controlling the discharge and close the valve controlling the supply passage when the throttle is open and to open the valve controlling the supply passage and close the valve controlling the discharge when the throttle is closed.

5. In a carbureter, the combination of a suction passage; means for delivering air and fuel to said passage; an auxiliary passage to which air is delivered leading to the suction passage; a throttle valve in the suction passage; a valve mechanism controlling the flow of air through the auxiliary passage, said valve mechanism being adapted to cut off the flow of air through the auxiliary passage; and devices actuated by fluctuations in the degree of vacuum at the discharge side of the throttle controlling said valve mechanism and enriching the mixture with a decrease in said vacuum.

6. In a carbureter, the combination of a suction passage; means for delivering air and fuel to said passage; an auxiliary passage to which fuel is delivered leading to the suction passage; a throttle valve in the suction passage; a valve mechanism controlling the flow of fuel and air through the auxiliary passage, said valve mechanism being adapted to cut off the flow of air through the auxiliary passage; and devices actuated by fluctuations in the degree of vacuum at the discharge side of the throttle controlling said valve mechanism and enriching the mixture with a decrease in said vacuum.

7. In a carbureter, the combination of a suction passage; means for delivering air and fuel to said passage; an auxiliary passage to which fuel and air are delivered leading to the suction passage; a throttle valve in the suction passage; a valve mechanism controlling the flow of air through the auxiliary passage and with it the flow of fuel through said auxiliary passage; and devices actuated by fluctuations in the degree of vacuum at the discharge side of the throttle controlling said valve mechanism and enriching the mixture with a decrease in said vacuum.

8. In a carbureter, the combination of a suction passage; means for delivering air and fuel to said passage; an auxiliary passage leading to the suction passage for augmenting the fuel supply to said suction passage comprising a well to which air and fuel are delivered; a valve mechanism between the well and the discharge of the auxiliary passage controlling the flow of fuel from said well; and devices actuated by fluctuations in the degree of vacuum at the discharge side of the throttle controlling said valve mechanism.

9. In a carbureter, the combination of a suction passage; means for delivering air and fuel to said passage; an auxiliary passage leading to the suction passage for augmenting the fuel supply to said suction passage comprising a well to which air and fuel are delivered; a valve mechanism between the well and the discharge of the auxiliary passage controlling the flow of air from said well; and devices actuated by fluctuations in the degree of vacuum at the discharge side of the throttle controlling said valve mechanism.

10. In a carbureter, the combination of a suction passage; means for delivering air and fuel to said passage; an auxiliary passage leading to the suction passage for augmenting the fuel supply to said suction passage comprising a well to which air and fuel are delivered; a valve mechanism between the well and the discharge of the auxiliary passage controlling the flow of air and fuel from said well; and devices actuated by fluctuations in the degree of vacuum at the discharge side of the throttle controlling said valve mechanism.

In testimony whereof I have hereunto set my hand.

FREDERICK O. BALL.